(12) United States Patent
Putra et al.

(10) Patent No.: US 11,988,303 B2
(45) Date of Patent: May 21, 2024

(54) PIPELINE ASSEMBLY AND METHOD OF INSTALLATION

(71) Applicant: Petroliam Nasional Berhad (PETRONAS), Kuala Lumpur (MY)

(72) Inventors: I Wayan Eka Putra, Kuala Lumpur (MY); Mohd Fauzi Bin Badaruddin, Kuala Lumpur (MY)

(73) Assignee: PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 0 days.

(21) Appl. No.: 16/964,927

(22) PCT Filed: Jan. 28, 2019

(86) PCT No.: PCT/MY2019/050007
§ 371 (c)(1),
(2) Date: Jul. 24, 2020

(87) PCT Pub. No.: WO2019/147124
PCT Pub. Date: Aug. 1, 2019

(65) Prior Publication Data
US 2021/0041040 A1     Feb. 11, 2021

(30) Foreign Application Priority Data
Jan. 26, 2018   (MY) .................... PI 2018000115

(51) Int. Cl.
*F16L 1/12*     (2006.01)
*F16L 1/20*     (2006.01)
(Continued)

(52) U.S. Cl.
CPC ............ *F16L 1/123* (2013.01); *F16L 1/205* (2013.01); *F16L 1/207* (2013.01); *F16L 1/24* (2013.01); *F16L 9/12* (2013.01)

(58) Field of Classification Search
CPC ..... F16L 1/20; F16L 1/205; F16L 1/24; F16L 1/12; F16L 9/12
See application file for complete search history.

(56) References Cited

U.S. PATENT DOCUMENTS 4,011,729 A * 3/1977 Kermel ............... F16L 1/163
                                                      405/158
4,065,822 A * 1/1978 Wilbourn ............. F16L 1/15
                                                     114/230.22
(Continued)

FOREIGN PATENT DOCUMENTS

| CN | 101010535 | 8/2007 |
| CN | 101566254 | 10/2009 |

(Continued)

OTHER PUBLICATIONS

International Search Report and Written Opinion dated Apr. 17, 2019, PCT Patent Application No. PCT/MY2019/050007, filed Jan. 28, 2019, Australian Patent Office, 8 pages.

*Primary Examiner* — Sean D Andrish
(74) *Attorney, Agent, or Firm* — Mannava & Kang, P.C.

(57) ABSTRACT

A method and a system for installing a non-metallic pipeline assembly, the method comprising the steps of: forming a pipe assembly by coupling a load bearing member and counter weight to a non-metallic pipe; floating the pipe assembly proximate to the water surface until in position, then; permitting the pipe assembly to sink to the sea bed.

7 Claims, 3 Drawing Sheets

(51) Int. Cl.
*F16L 1/24* (2006.01)
*F16L 9/12* (2006.01)

(56) References Cited

U.S. PATENT DOCUMENTS

| | | | | |
|---|---|---|---|---|
| 2006/0140726 A1* | 6/2006 | Pollack | ................ | E21B 17/012 |
| | | | | 405/203 |
| 2009/0293792 A1* | 12/2009 | Alliot | ........................ | F16L 1/24 |
| | | | | 114/244 |
| 2012/0160510 A1* | 6/2012 | Bhat | ........................ | F16L 1/24 |
| | | | | 166/367 |
| 2014/0044493 A1* | 2/2014 | Hatton | ................... | E21B 17/01 |
| | | | | 405/224.2 |

FOREIGN PATENT DOCUMENTS

| | | | |
|---|---|---|---|
| GB | 2435083 | * | 8/2007 |
| JP | 2001032962 A | | 2/2001 |
| KR | 20110000816 A | | 1/2011 |
| WO | 2003062688 A1 | | 7/2003 |
| WO | WO 2011/008593 | * | 1/2011 |
| WO | 2015049348 A2 | | 4/2015 |

\* cited by examiner

PIPELINE ASSEMBLY AND METHOD OF INSTALLATION

PRIORITY

The present application is a national stage filing under 35 U.S.C. 371 of PCT application number PCT/MY2019/050007, having an international filing date of Jan. 28, 2019, which claims priority to Malaysian patent application number PI 2018000115, having a filing date of Jan. 26, 2018, the disclosures of which are hereby incorporated by reference in their entireties.

FIELD OF THE INVENTION

The invention relates to the transport of hydrocarbons particularly for offshore use. In particular the invention relates to pipelines system used for said transport and the means of installing said pipeline in offshore conditions.

BACKGROUND

Pipelines for offshore use have typically been metallic which in a marine environment will limit the longevity of the system. Cathodic protection is critical for maintaining the integrity of the pipeline during use. Nevertheless, cathodic protection is not infallible, and the consequential corrosion should a portion of the sacrificial anode fail in a single section, may lead to severe damage to the entire pipeline.

Non-corrosive materials, such non-metallic pipes (NMP) are generally inappropriate for a variety of reasons including the inherent issues of having a specific gravity similar to water, and so making installation difficult due to the relative buoyancy.

SUMMARY OF INVENTION

In a first aspect the invention provides a method for installing a subsea pipe assembly, the method comprising the steps of: forming a pipe assembly by coupling a load bearing member and counter weight to a non-metallic pipe; floating the pipe assembly proximate to the water surface until in position, then; permitting the pipe assembly to sink to the sea bed.

In a second aspect the invention provides a pipe assembly, comprising: a pipe having a load bearing member coupled along a length of said pipe, said load bearing member arranged to receive a tensile force sufficient to pull the pipe assembly through water; a counter weight coupled along the length of the pipe, said counter weight arranged to increase the specific gravity of the pipe assembly.

By providing a load bearing member to support the tensile stress for installation, allows the use of substantial less strong materials, such as NMP's. Further, the use of a counter weight solves the issue of buoyancy of the NMP. Consequently, the two critical features allow the use of NMP for an offshore pipeline that were not previously available.

In one embodiment, the load bearing member and the counter weight may be provided in a single element, such as a chain. The chain may be mounted to the NMP, and support the applied tensile installation loads. Once in place, the chain may then act as a counter weight to allow placement of the pipe on the sea floor, with the weight of the chain overcoming the buoyancy of the NMP.

DETAILED DESCRIPTION

Whilst the invention is applicable for any installation site from offshore to the shoreline, the following example will make reference to drilling platforms.

Figure 1:
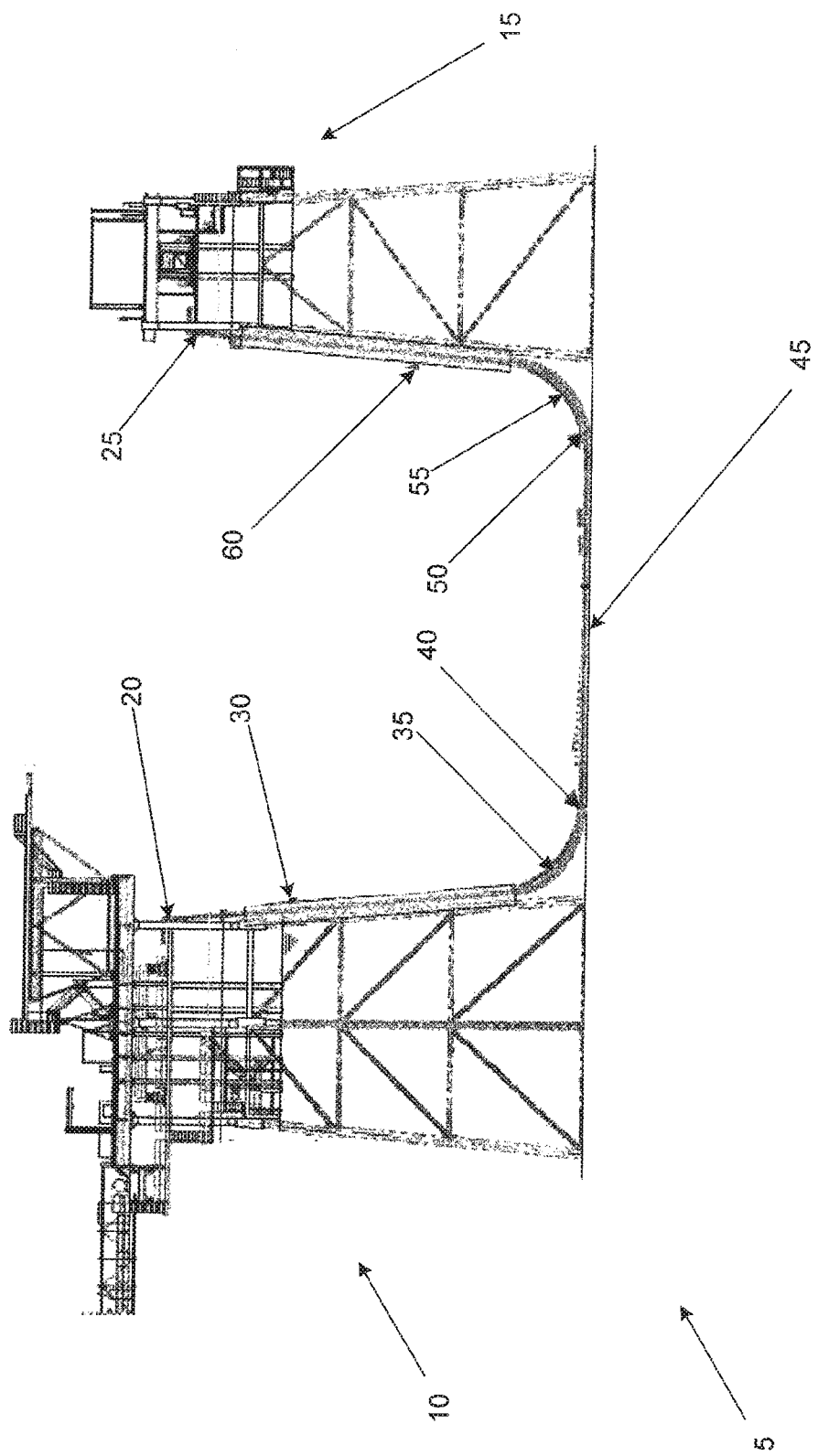
FIG. 1 is a schematic view of a pipeline according to one embodiment of the present invention.

FIG. 1 shows a schematic view of a pipeline 5 following installation, as it spans between a first platform 10 and a second platform 15. The pipeline includes pipes of two different types of construction, being a thermoplastic composite pipe (TCP) 40 connecting 45 with a reinforced thermoplastic pipe (RTP) 50.

The first platform 10 includes an end fitting and hang off 20 to which the pipe is mounted. From each drilling platform 10, 15 is provided an I-Tube 30, 60 to guide and direct the pipe to the base of the drilling platform so as to lay across the sea floor. In order to achieve the correct curvature of the pipe as it moves from a substantially vertical position in the I-Tube to the horizontal position laying on the seabed, bend restrictors 35, 55 are further provided and thus controlling the orientation of the pipe leading from each of the drilling platforms.

A feature of the installation of the pipeline involves the use of chains as the load bearing component of the assembled pipeline. The chain is coupled to the pipe in a manner to bear the tensile load applied during the installation, such that the assembly of the chain and pipe is pulled into position.

Once in position, the chain acts as a counter weight against the buoyancy of the pipe to ensure the pipe settles on the sea floor. To this end, the counter weight acts to ensure the pipe assembly has a specific gravity substantially greater than 1.0. This combination of features of load bearing member and counterweight is critical in permitting the use of non-metallic materials for offshore pipes. As discussed, metallic pipes have inherent flaws in offshore applications, but in the absence of a viable alternative, have been the material of choice.

It will be appreciated that the load bearing member, being a member coupled to the pipe and bearing the tensile load as the pipe is pulled into place, may be a distinct element from the counterweight. The counterweight, therefore, may be a heavy and relatively inexpensive material, such as concrete, with the load bearing member being a cable that may be selectively releasable from the pipe for reuse.

In the embodiment of FIGS. 2A to 2C and FIG. 3, however, the simplicity and ease of use of a chain acting as both the load bearing member and counterweight provides substantial advantage.

Figure 2A:
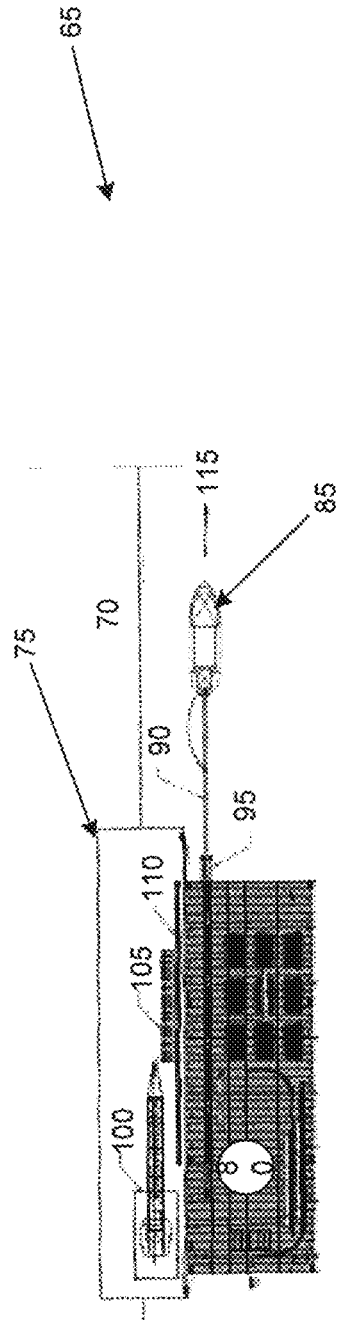
FIGS. 2A to 2C are plan sequential views of the installation of a pipeline according to a further embodiment of the present invention.
Figure 2B:
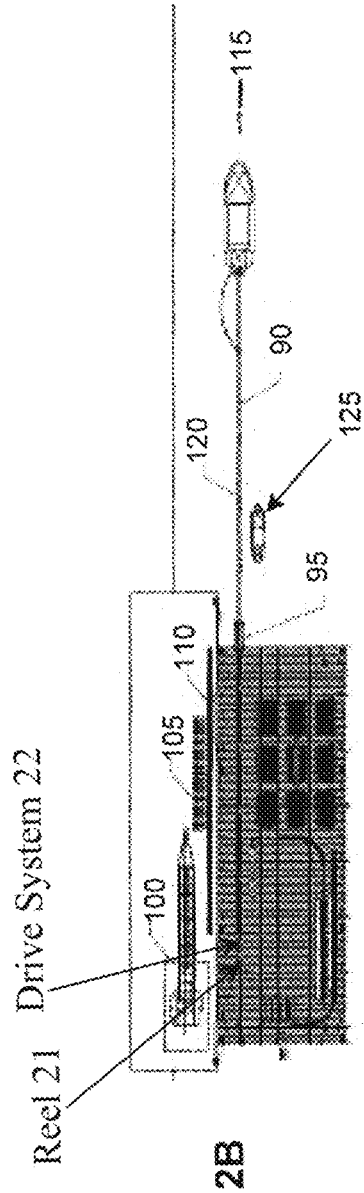
Figure 2C:
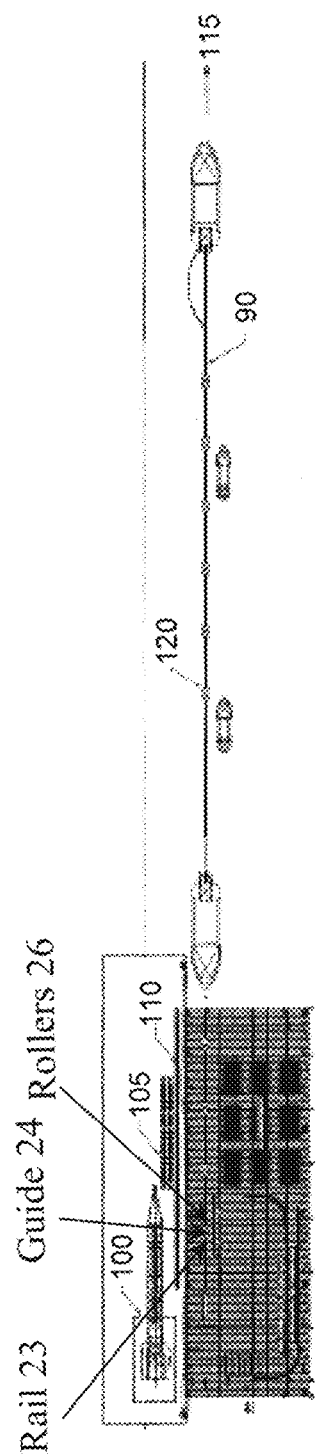

Referring to FIGS. 2A to 2C, one method of installation is shown whereby a shipyard 70 may include a wharf 75 having a crane 100 and platform 80. The wharf 75 and platform 80 act as an installation site whereby lengths of chain 110 are coupled to the pipe. As the pipe and chain are assembled, they are directed through a chute 95 and attached to a boat 85 which progressively draws 115 the pipe/chain assembly 90 out from the wharf 75.

As additional lengths of the pipe 90 are drawn out 115, stabilizing craft 125 may be used to stabilize the length of pipe as well as attach buoyancy tanks 120 to maintain the pipe in a buoyant condition until properly positioned.

As seen in FIG. 2C, on completion of the pipeline 90, a second boat couples to the new assembled end of the pipe 90 and, together, the boats guide the pipeline to the desired location.

Figure 3:
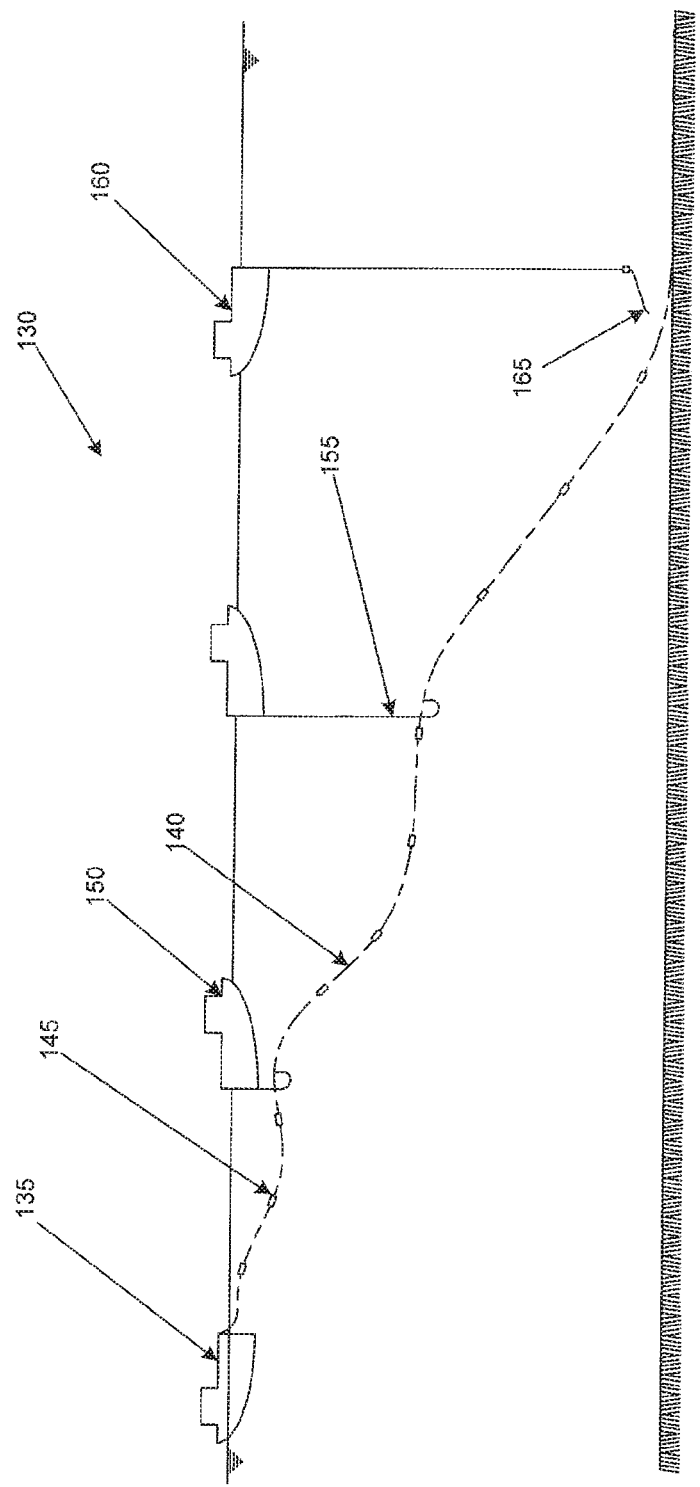
FIG. 3 is an elevation view of the installation of a pipeline according to a further embodiment of the present invention.

FIG. 3 shows a schematic view of the installation method. The pipe assembly is floated proximate to the water surface until in position. Once the pipeline assembly 140 has been positioned appropriately the buoyancy tanks are removed and the pipe assembly is permitted to sink. The carrier boats 135, 150, 160 progressively lower the pipeline assembly 140 with counterweight chain via cabling 155 on each of the boats. The pipeline assembly 140 with the counterweight chain may further include additional counterweights 145 which may be in the form of concrete mats which further assist in stabilizing the position of the pipeline assembly 140 once located on the seabed.

Thus the pipe is progressively lowered and once in position the lowering cable 155 is detached 165 separating the boat from control of the pipe. This happens progressively as shown in FIG. 3 and so the pipe is progressively placed on the seabed for later connection to the supply.

The installation method can be used for very significant lengths being well in excess of one kilometer. The limiting factor being the tensile strength of the load bearing member which for the present example may be a chain having a dry weight of 25 to 30 kilograms per meter. This will vary given the specific gravity of the non-metallic pipe being used. For instance such NMP's may have a specific gravity of about 1.4. While denser than water, the buoyant forces will prevent placement of the pipe without the use of the counter weight.

The process of pipeline assembly and launching may include placing a reel 21 of non-metal pipe (NMP) onto a drive system 22 for the reel 21. The chain may fit to a rail 23 having a guide 24 and rollers 26 to couple to the pipeline as well as the buoyancy tanks.

The chain may be positioned so as to be beneath the pipe and thus through launching the pipe will remain relatively buoyant and the chain free to move to a lower position during the deployment. The chain link may also function to prevent the strap slip along the pipe during the towing process. The pipe buoyancy tanks and chain are then progressively assembled as the pipe is launched and dragged by the boat. Typically the chain will be mounted to the pipe every 0.2 to 0.5 m though this will be subject to installation and design criteria that may vary considerably. It may be preferable to use a non-metallic strap in couple the chain to the pipe.

The buoyancy tanks may be installed in pairs so as to ensure a uniformly buoyant force to the pipe. The buoyancy tanks may be mounted to the pipe every 9 or 10 meters but again this will depend upon a range of criteria including environmental conditions. The buoyancy tanks may be mounted to the pipe using a non-metallic strap. Importantly the buoyancy tanks will include a wire rope connected to each of the buoyancy tanks and a stripping line.

On positioning the pipe at the desired location, the buoyancy tanks are progressively stripped from the pipeline by the stripping line shearing through the non-metallic straps, allowing the progressive sinking of the pipe and weighted chain.

The invention claimed is:

1. A method for installing a non-metallic pipeline, the method comprising the steps of:
   placing a reel of the non-metallic pipeline onto a drive system for the reel;
   fitting a load bearing member and counter weight to a rail having a guide and rollers;
   coupling the load bearing member and the counter weight from the rail to the non-metallic pipeline,
      the load bearing member and the counter weight being the same element, and said element being a chain;
      said chain and pipeline coupled at a plurality of spacings along a length of said pipeline so as to form a pipeline chain assembly;
      said chain bearing a tensile load and supporting a tensile stress during installation;
   floating the pipeline chain assembly proximate to the water surface until in an appropriate position, then; and
   permitting the pipeline chain assembly to sink to the sea bed;
      said non-metallic pipeline having a buoyancy; and
      said chain having a weight overcoming the buoyancy of the non-metallic pipeline.

2. The method according to claim 1, further including the steps of: before the floating step, coupling selectively removable buoyancy tanks to the pipeline chain assembly, and, after the floating step, detaching the buoyancy tanks from the pipeline chain assembly.

3. The method according to claim 1, wherein the pipeline chain assembly is pulled by at least one boat so as to place the pipeline chain assembly in the position.

4. The method according to claim 1, wherein the pipeline assembly includes an additional counterweight in the form of a concrete mat.

5. A system and non-metallic pipeline assembly arranged to be installed offshore, comprising:
   a drive system for a reel of non-metallic pipeline;
   a rail having a guide and rollers, wherein the rail is fitted to a load bearing member and a counter weight to couple the load bearing member and the counter weight to the non-metallic pipeline from the reel;
   a pipeline having the load bearing member and the counter weight coupled along a length of said pipeline,
      the load bearing member and the counter weight being the same element,
      said element being a chain coupled along the length of the pipeline at a plurality of spacings so as to form the pipeline assembly,
      wherein said chain is coupled to the pipeline in a manner to bear a tensile load applied and support a tensile stress during installation as the pipeline assembly is pulled through water into position;
      said non-metallic pipeline having a buoyancy; and
      said chain having a weight overcoming the buoyancy of the non-metallic pipeline.

6. The system and non-metallic pipeline assembly according to claim 5, further including a plurality of selectively removable buoyancy tanks coupled along the length of the pipeline.

7. The system and non-metallic pipeline assembly according to claim 5, further including an additional counterweight in the form of a concrete mat.

* * * * *